J. D. SPRECKELS, Jr., AND R. LABORDA.
SUGAR PACKING AND BOXING MACHINE.
APPLICATION FILED JUNE 24, 1918.
1,308,266.
Patented July 1, 1919.
7 SHEETS—SHEET 1.
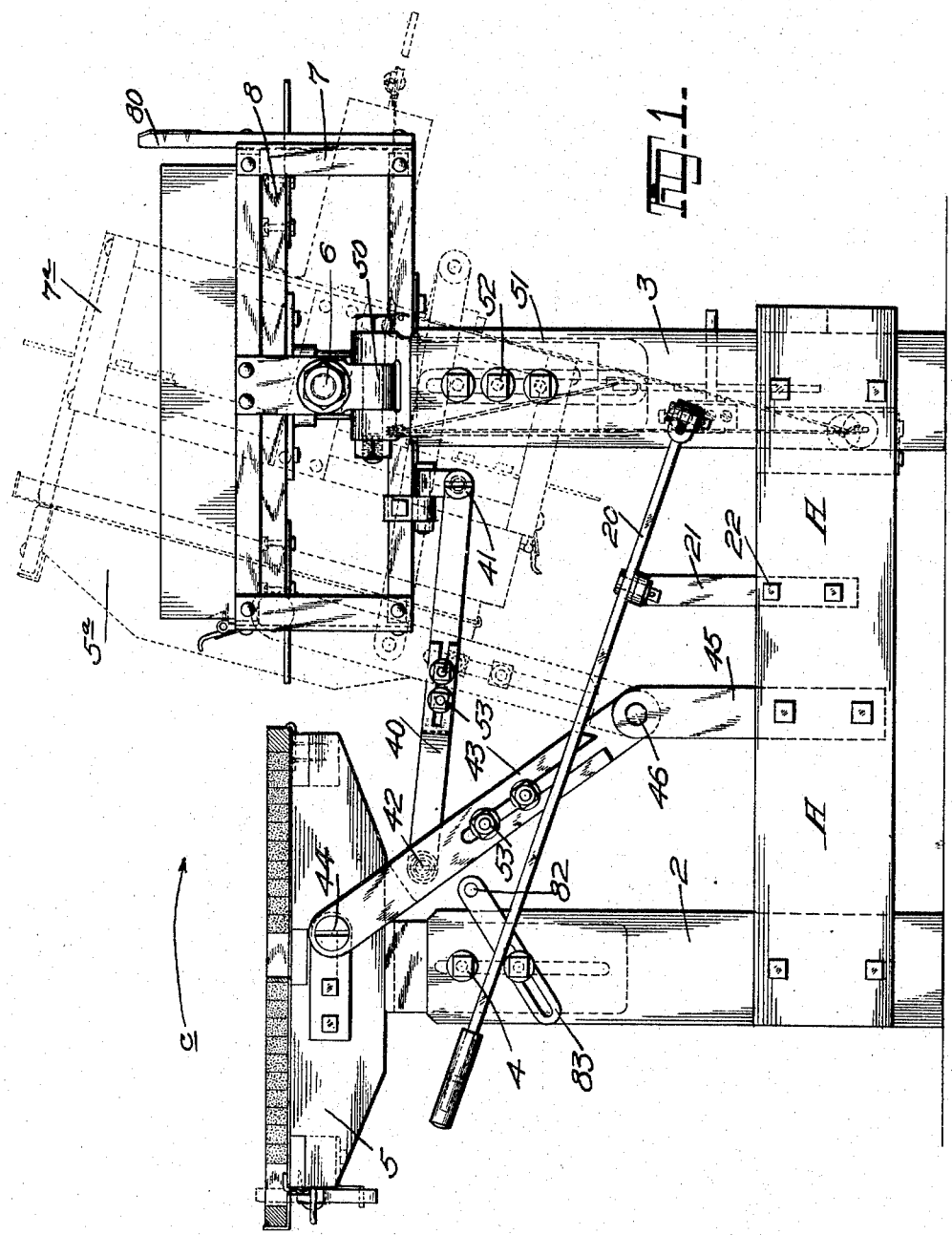
INVENTORS
JOHN D. SPRECKELS JR.
BY  RICHARD LABORDA
ATTORNEYS

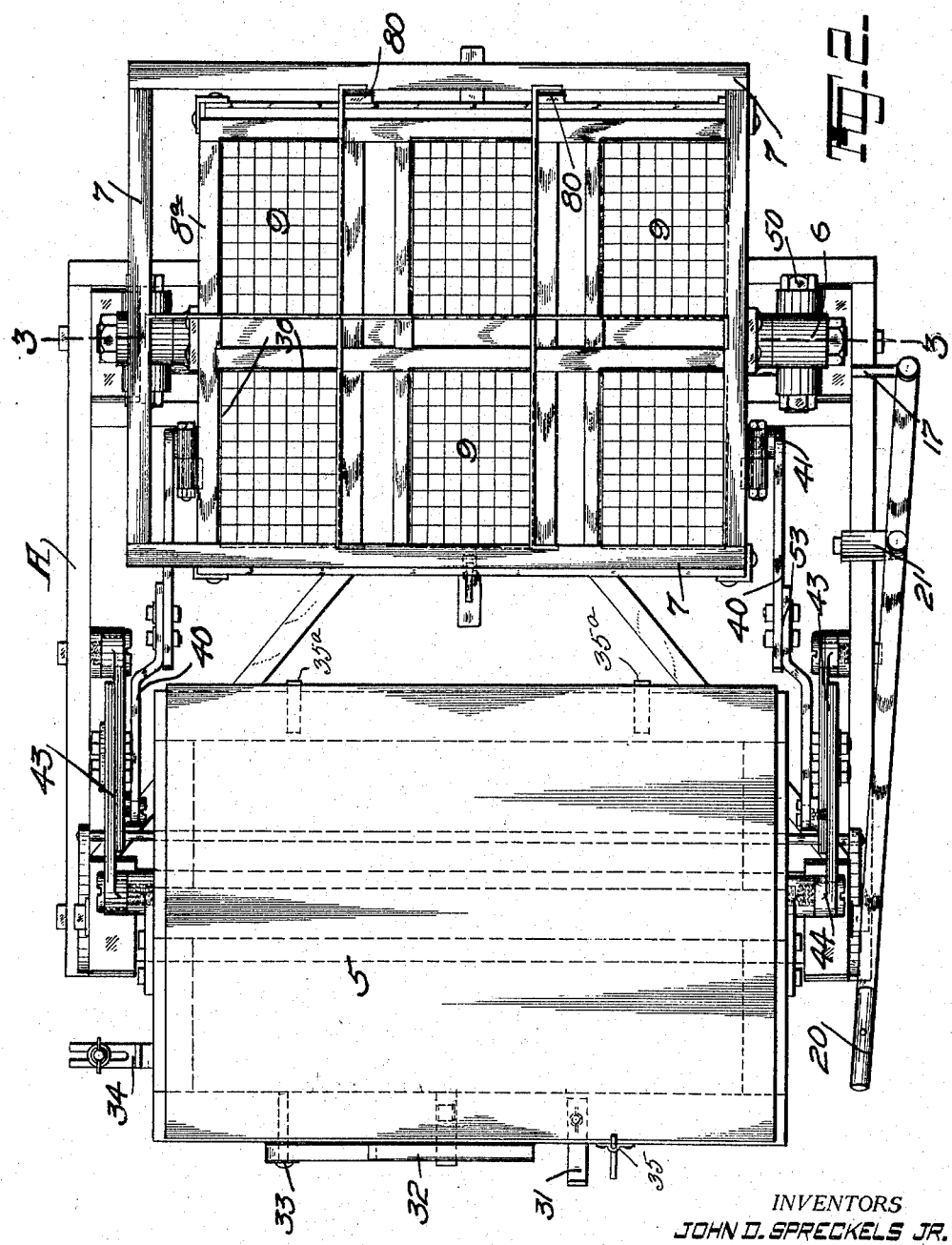

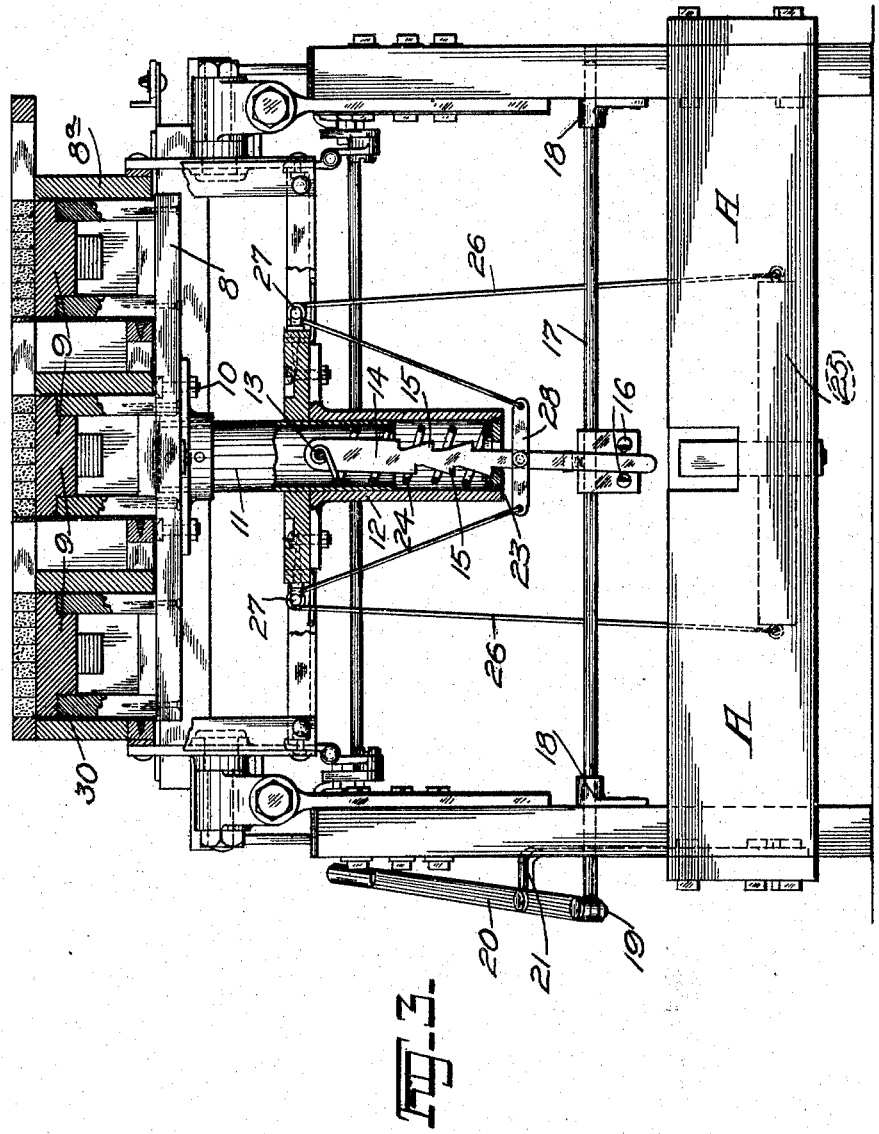

J. D. SPRECKELS, Jr., AND R. LABORDA.
SUGAR PACKING AND BOXING MACHINE.
APPLICATION FILED JUNE 24, 1918.
1,308,266.
Patented July 1, 1919.
7 SHEETS—SHEET 4.
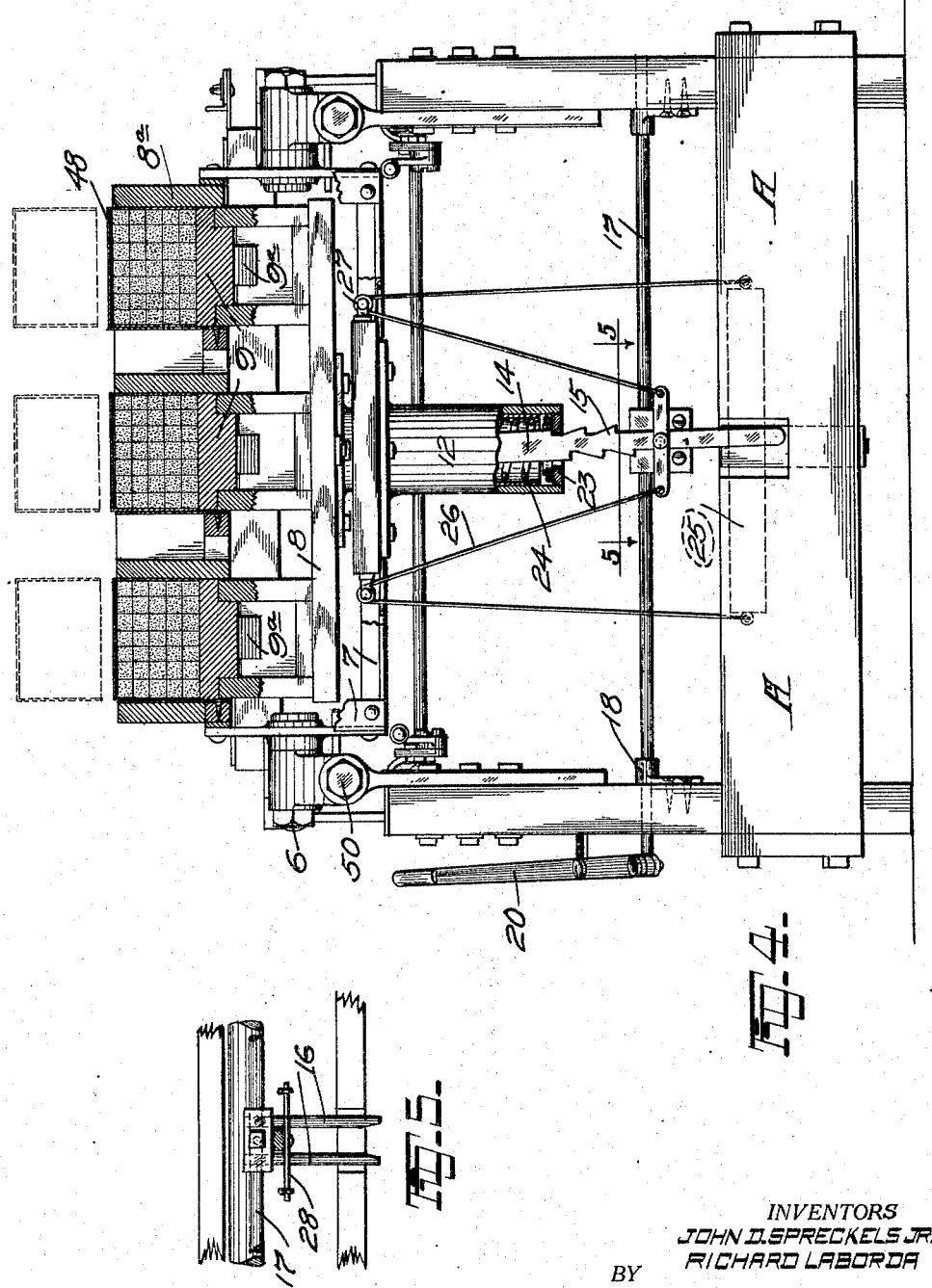
INVENTORS
JOHN D. SPRECKELS JR.
RICHARD LABORDA
BY
Strong & Townsend
ATTORNEYS

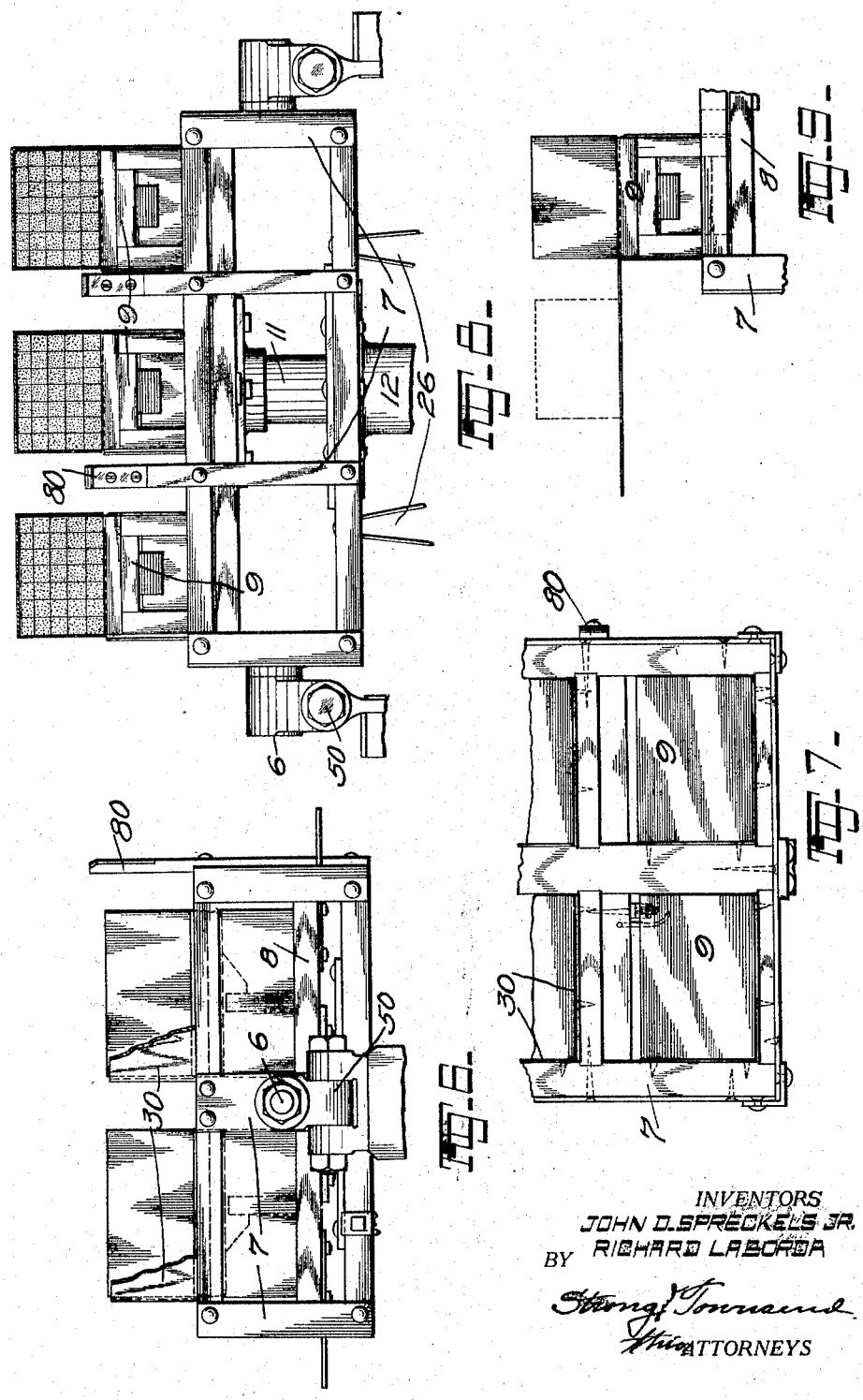

J. D. SPRECKELS, Jr., AND R. LABORDA.
SUGAR PACKING AND BOXING MACHINE.
APPLICATION FILED JUNE 24, 1918.
1,308,266.
Patented July 1, 1919.
7 SHEETS—SHEET 6.
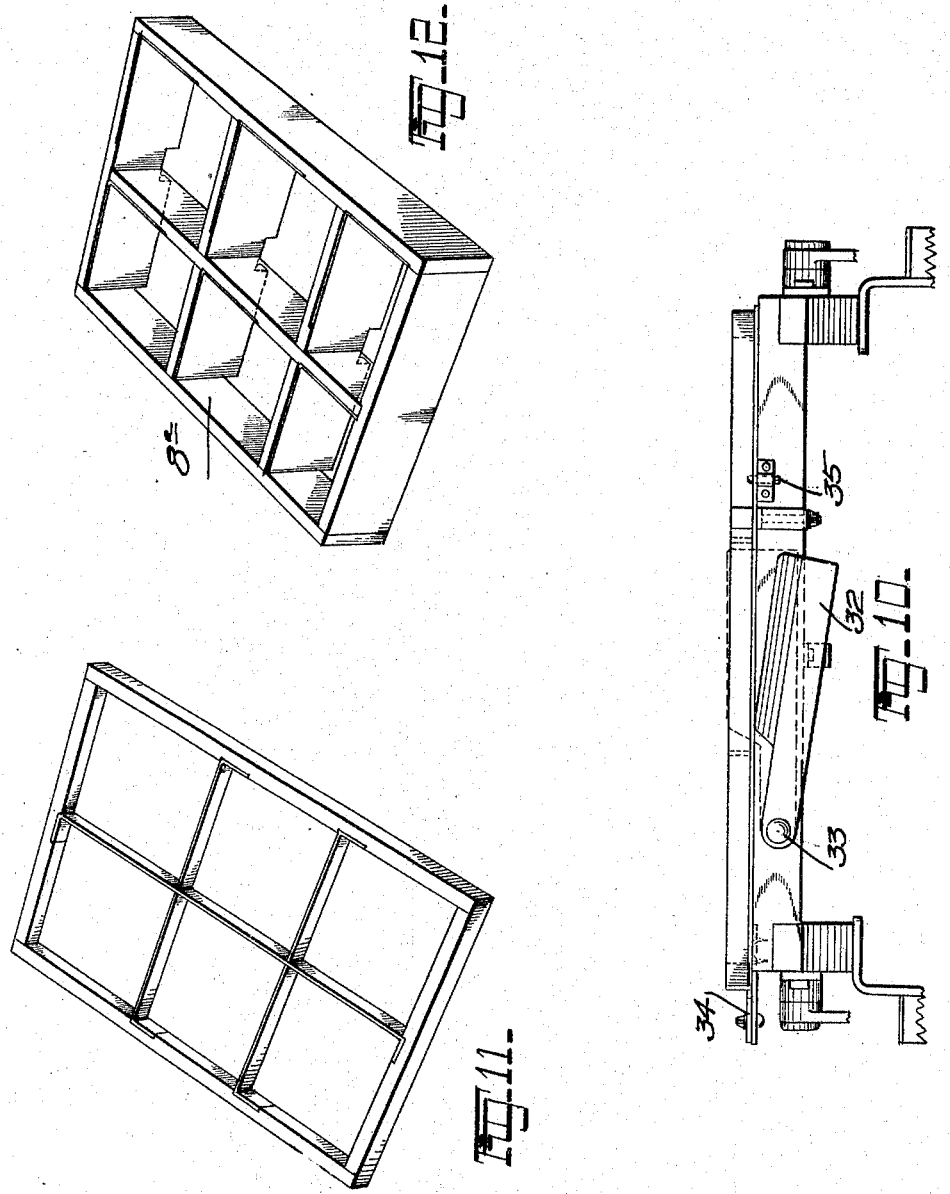
INVENTORS
JOHN D. SPRECKELS JR.
RICHARD LABORDA
BY
ATTORNEYS

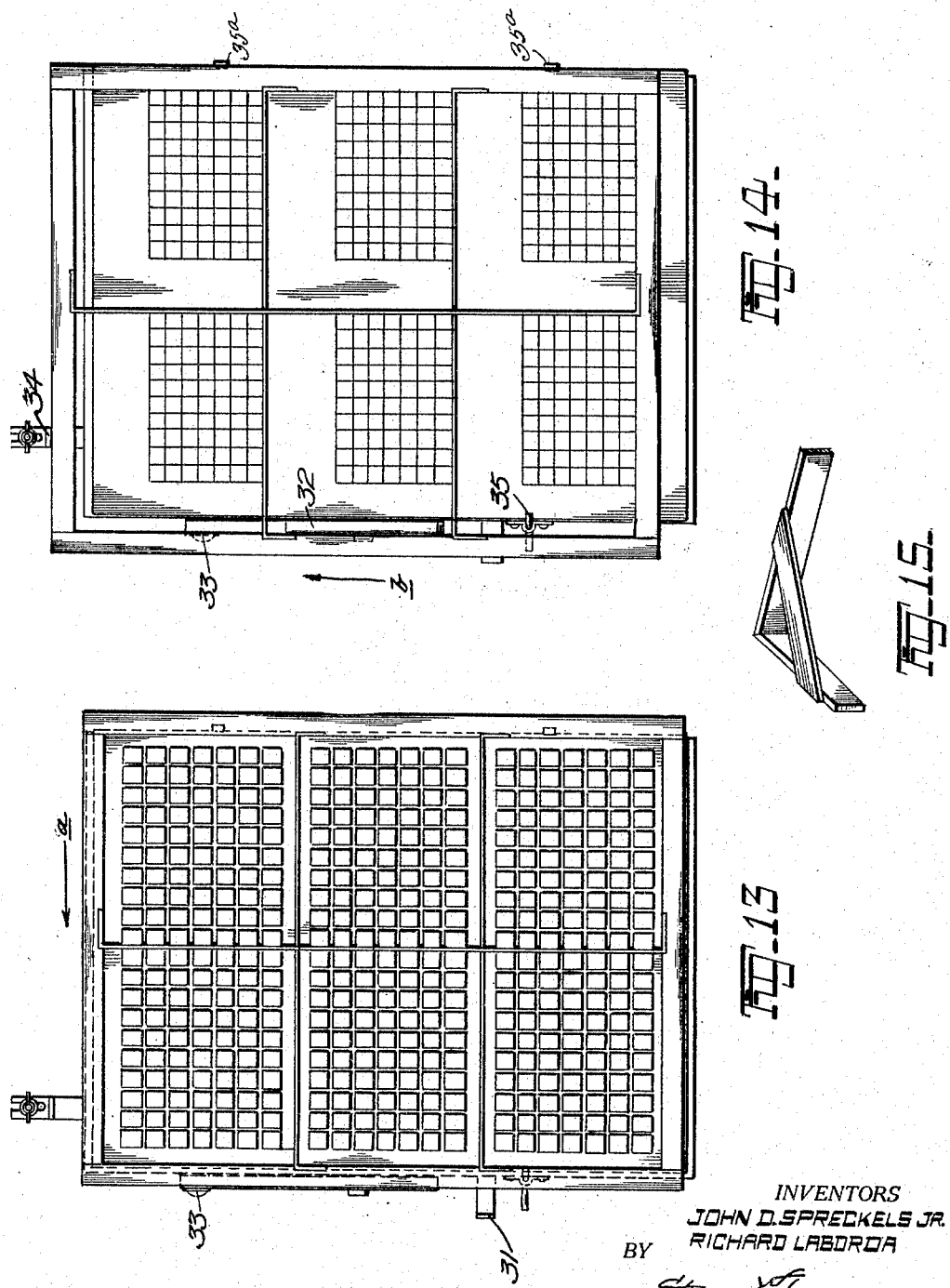

UNITED STATES PATENT OFFICE.

JOHN D. SPRECKELS, JR., AND RICHARD LABORDA, OF SAN FRANCISCO, CALIFORNIA.

SUGAR PACKING AND BOXING MACHINE.

1,308,266.  Specification of Letters Patent.  Patented July 1, 1919.

Application filed June 24, 1918. Serial No. 241,491.

*To all whom it may concern:*

Be it known that we, JOHN D. SPRECKELS, Jr., and RICHARD LABORDA, a citizen of the United States and a subject of the King of Spain, respectively, residing at the city and county of San Francisco and State of California, have invented new and useful Improvements in Sugar Packing and Boxing Machines, of which the following is a specification.

This invention relates to a machine specially designed to facilitate the packing and boxing of cube sugar or other articles of a similar nature, which are arranged evenly in rows, and finally placed in layers and boxed in this order.

One of the objects of the present invention is to improve and simplify the construction and operation of machines of the character described, so that said machines will be more reliable and efficient in use, comparatively simple and inexpensively constructed and operated, and so designed as to be quick and positive in action, and capable of packing a plurality of boxes in unison.

Another object of the invention is to provide means for inspecting the cubes on all sides before they are assembled and placed in the boxes to permit soiled or broken cubes to be removed before packing, and furthermore to provide means for arranging the cubes in segregated assembled rows of one layer each, which are placed in their respective boxes in unison. Further objects will hereinafter appear.

The invention consists of the parts and the construction and combination of parts as hereinafter more fully described and claimed, having reference to the accompanying drawings in which—

Figure 1 is a side elevation of the sugar packing and boxing machine.

Fig. 2 is a plan view of the same.

Fig. 3 is a central vertical cross section taken on line 3—3, Fig. 2.

Fig. 4 is a similar view showing the sugar packed and the boxes for their reception placed in position.

Fig. 5 is a detail plan view of the fingers by which the rack bar is moved.

Fig. 6 is a detail end view of the main receiving platform, and the frame in which it is vertically movable.

Fig. 7 is a plan view of the same.

Fig. 8 is a side elevation of Fig. 6, showing the receiving platforms in their extreme raised position.

Fig. 9 is a detail view showing how the cartons in which the sugar is placed are removed.

Fig. 10 is an end view of the assembling table.

Fig. 11 is a perspective view of the assembling frame.

Fig. 12 is a perspective view of the guide frame.

Fig. 13 is a plan view of the assembling table, showing the position of the cube sugar when first received.

Fig. 14 is a similar view of the cube sugar after it has been assembled by the assembling frame.

Fig. 15 is a perspective view of an independent assembling frame.

Referring to the drawings in detail, A indicates a main supporting frame, and 2 and 3, a pair of uprights or standards formed at the respective ends of the frame. Pivotally mounted between brackets 45 as at 46 is a pair of arms 43, and pivotally mounted between said arms is a receiving table 5, which is normally supported by the standard 2.

Pivotally mounted between the upper ends of the standards 3 as at 6 is a guide frame 7 in which is mounted a receiving base 8. The base 8 is vertically slidable in the frame 7, and serves as a support for a plurality of receiving platforms 9. The base 8 is in reality secured as at 10 on the upper end of a tube 11, which, in turn, is slidably mounted in a vertically positioned bearing member 12 secured in any suitable manner in the lower end of the guide frame 7. Pivotally mounted within the tube 11 as at 13 is a rack bar 14, on each side of which is formed teeth 15. The lower end of the rack bar passes between a pair of pins 16, which are carried by a clamp secured on a rod 17 extending crosswise of the standard 3. This rod is slidably mounted in bearings 18, and one end of the rod is pivotally connected at 19 with an operating lever 20, which, in turn, is carried by a bracket 21 secured to the main frame A as at 22. Formed in the lower end of the bearing member 12 in which the tube 11 is slidably mounted is a head member 23, and interposed between said head member and the pin 13, about which the rack bar 14 swings, is a counterbalancing spring 24. The head member 23 is slotted longitudinally to permit the rack bar passing therethrough to swing, the length of the slot, determining the swinging movement of said rack bar. The whole weight of the base 8 and the receiving platforms carried thereby, together with the tube 11 and the rack bar, is carried by one or another of the teeth 15 formed on the rack bar; it can, therefore, be seen that when the lever 20 is rocked a sliding movement will be transmitted to the shaft 17, and that the bracket carrying the pins 16, which straddle the lower end of the rack bar, will transmit a rocking movement to the rack bar, which will bring the lowermost tooth 15 out of engagement with the head member 23, and thus permit it to drop until the second tooth engages the opposite side of the head 23. A rocking movement is transmitted to the rack bar after each successive layer of sugar is placed upon the receiving platforms 9 to maintain the uppermost layer at a predetermined level. Each movement transmitted to the rack bar 15 will, therefore, cause the receiving platforms to recede the depth of one tooth, the depth of each tooth corresponding to the thickness of one layer of sugar, thus maintaining the top level of the last layer of sugar placed on the receiving platforms at a predetermined or constant level. A spring 24 is employed for the purpose of counterbalancing the weight of the sugar as it is placed upon the receiving platforms. A second weight is also employed for the purpose of counterbalancing the weight of the base 8, the platforms 9, the tube 11 and the rack bar 14. This weight is shown at 25, and it is connected to the rack bar by means of flexible cables 26 passing over pulleys 27 arranged at each end of the bearing 12, the free ends of the cables being attached to a cross-bar 28 secured directly on the rack bar. The receiving platforms 9 are removable with relation to a frame 8ª carried by the base 8, as will hereinafter be more fully described, but said frame, together with the receiving platforms, move as a unit in a downward direction after each layer of sugar is placed thereon. Secured in the guide frame, which, in reality, is stationary, except for the pivotal movement to which it is subjected, are a series of angle plates 30. There is one angle plate arranged exteriorly of each movable receiving platform 9, and said angle plates are provided for the purpose of functioning as temporary guides for the sugar received. The sugar to be packed is, in the present instance, placed upon plates and arranged substantially as shown in Fig. 13, that is, the cubes are arranged in squares, and also separate with relation to each other, this being due to the formation of the molds in the molding machine. The sugar after being molded in this machine is discharged directly upon a plate in the formation shown in Fig. 13. This plate after passing through a drier is placed upon the receiving table 5, and is here secured by a latch 35 and a pair of stops 35ª. An assembling frame such as shown in Fig. 11 is then placed on top of the plate, the first position of the assembling frame being shown in Fig. 13, and the final position assumed by said frame, being shown in Fig. 14, that is, the assembling frame is first placed upon the table as shown in Fig. 13, it is then pulled by the operator in the direction of arrow $a$ until the frame engages a stop lug 31 secured on the table. This causes the respective rows of cube sugar to contact with each other in one direction. A sliding movement is next imparted to the frame in the direction of arrow $b$. See Fig. 14. This forces the cubes together, and they will, in this manner, be completely assembled while they previously were entirely separate from each other. The assembling frame is locked in the last position by means of a latch 32, which is pivotally secured to the table as at 33. This latch passes upwardly between the assembling frame and the edge of the table, and thus secures said frame against a sliding movement on the table in the direction opposite to arrow $a$, while the lug 31 secures the frame against a sliding movement in the direction of arrow $a$. The frame is then secured against a sliding movement in the direction of arrow $b$, or in the direction opposite thereto, by a stop lug 34, the assembling frame is thus thoroughly locked and secured to the assembling table after the sugar has been assembled, and it can, therefore, be seen that the sugar thus assembled is ready to be transferred to the receiving platforms 9.

To transfer the sugar to the receiving platforms 9 it is necessary to tilt the receiving table until it assumes the dotted line position shown at 5ª. This is accomplished by grasping the outer edge of the table and tilting it forwardly in the direction of arrow $c$. The guide frame 7, together with the base 8, and the receiving platforms supported thereon, are simultaneously tilted in the opposite direction about the pivot 6 until the dotted line position shown at 7ª is assumed. See Fig. 1. This movement about the pivot 6 is transmitted from the table 5 when this is tilted by a pair of links 40, which are pivotally attached to the guide frame at one end as shown at 41, while the opposite ends are pivotally attached as at 42 to the supporting arms 43, which carry the receiving table 5. The standards 2, in reality, only serve the function of a support for the receiving table when this assumes a horizontal full line position shown in Fig. 1, and the table is otherwise entirely supported by the arms 43, and guided when thrown forward by the operator.

Assuming that the base 8 and the receiving platforms carried thereby have been raised to their highest position, and that the first layer of sugar is going to be placed thereon, it will only be necessary to tilt the receiving table and the frame 8 to the position shown in Fig. 1, the tilting of the receiving table, and the throwing of the same into the forward position being accomplished by the operator, while the tilting of the frame 7 is automatically taken care of by the link connections shown. By referring to the dotted line positions of the respective members 7 and 5, that is, the guide frame and the receiving table, it will be seen that the receiving table is thrown to an angle beyond the vertical line, or into a position where the sugar carried by the table will fall away from the face of the table, and will thus be deposited upon the receiving platforms. The assembling frame is simultaneously raised with relation to the receiving table, and is deposited, together with the sugar, upon the receiving platforms. This is accomplished by providing a pair of upwardly extending arms 80. One of these arms strikes the locking latch 32 and swings it back to the position shown in Fig. 10, thus releasing the assembling frame with relation to the receiving table, so that it may remain upon the receiving platforms 9, together with the sugar. The angle plates 30, together with the crossbars on the receiving frame will here serve as guides for the cube sugar and hold the same against displacement when the table and the frame 7 are returned to normal position, the normal position of the frame 7 and the receiving platforms carried thereby after one layer of sugar has been deposited upon the same being shown in Fig. 3. The operator will now rock the lever 20, which, as previously stated transmits a sliding movement to the rod 17, which rocks the rack bar 14 to a position where it will drop one tooth. The base 8 and the receiving platforms carried thereby, together with the assembling frame, will thus recede a depth equal to one layer of cubes, and thus present a new surface for the reception of the second layer of cubes. The operator will next remove the old plate and replace it with a new plate filled with sugar from the drier. He next removes the assembling frame from the guide frame and places it in position upon the receiving table, or the new plate, so as to assemble the cubes, the assembling frame being then locked against movement to permit the next layer of cubes to be transferred from the receiving table to the receiving platforms, which have already been lowered one step to permit the second layer of cubes to be received.

The same cycle of operation is repeated until five layers have been deposited or placed upon the receiving platforms. The receiving platforms have, at this time, receded to the limit of movement, as the rack bar has reached the uppermost tooth as shown in Fig. 4. The receiving table, together with the guide frame 7, are now tilted into an intermediate inclined position not here shown, that is, to a point where the arms 43 rest upon pins 82, which are carried by adjustable arms 83, said inclined position being assumed to permit the cube sugar to rest against the angle plates, and to prevent the sugar from being disarranged, the cubes having no tendency to disarrange themselves in this position, as they all lean toward the angle plates. The guide frame may now be removed and the cartons or boxes placed over the cubes as shown at 48. The base, together with the receiving platforms are then raised by the operator, leaving the same until the position shown in Fig. 8 is assumed. Each individual box containing the cubes in a packed position is then removed with relation to their respective receiving platforms in the manner shown in Fig. 9, and are then ready to receive a cover, and to be labeled or otherwise treated.

By referring to Fig. 1, it will be seen that the bearings in which the guide frame 7 is pivotally mounted are themselves pivotally mounted as at 50 in brackets 51, which are vertically adjustable upon the standards 3, said bearing brackets when adjusted being secured by means of bolts 52. The vertical adjustment of the respective brackets 6 is provided to permit the guide 7 to be tilted if desired. It is, therefore, necessary to provide means for adjusting the length of the arms 43, and also the links 40; they are therefore, made in sections as shown, and slotted to permit extension or shortening, and, when adjusted, to be rigidly secured by means of bolts 53.

The object of tilting the guide frame and the receiving table is merely to prevent the cube sugar from becoming disarranged, that is, a slight lean or incline of the receiving table and the frame 7 causes the cubes when arranged to lean against the assembling frame and the angle plates 30, this being desirable as it has otherwise been found that there is a tendency for some of the cubes, particularly the outer rows, to disarrange themselves during the transmitting operation, which takes place when the respective tables and platforms are tilted.

By referring to Fig. 9, it will be seen that the boxes when filled are removed by sliding them off on the receiving plate. This is not essential, however, as each individual box filled with sugar may be removed by simultaneously removing the respective temporary receiving platforms 9. This is possible as the openings in the guide frame which supports the same are larger than the receiving platforms, it is, therefore, possible for the operator to place his hand under each receiving platform, and to remove it bodily with the sugar and the box covering the same. Each platform, together with the sugar in the box in which it is contained, is then merely turned over when removed and the respective receiving platforms are then returned to position, small handhole projections 9ª being formed on the bottom of each receiving platform to facilitate this operation. Other features of a similar nature may be resorted to if desired, and we furthermore wish it understood that the materials and finish of the respective parts forming the machine may be such as the experience and judgment of the manufacturer may dictate.

Having thus described our invention what we claim and desire to secure by Letters Patent is—

1. A sugar packing and boxing machine comprising a main frame, a receiving table pivotally mounted in said frame, a receiving platform pivotally mounted in the frame, means for assembling a plurality of cubes of sugar on the receiving table, and means for tilting the receiving table, and platform toward each other in unison to a position where the sugar will be transferred by gravity to the receiving platform.

2. A sugar packing and boxing machine comprising a main frame, a receiving table pivotally mounted in said frame, a receiving platform, a rocking support therefor, means for assembling a plurality of cubes of sugar on the receiving table, and means for tilting the receiving table and the platform in unison to transfer the assembled sugar cubes from the table to the receiving platform, said means comprising a pivotal mounting for the platform in the rocking support and a link connection between the rocking support and the table.

3. A sugar packing and boxing machine comprising a main frame, a receiving table pivotally mounted in said frame, a receiving platform pivotally mounted in the frame, means for assembling a plurality of cubes of sugar on the receiving table, and means for tilting the receiving table and the platform in unison to transfer the assembled sugar cubes from the table to the receiving platform, means adjacent the receiving platform for guiding the sugar received by the platform and means for transmitting a receding movement to the receiving platform the depth of one layer of cubes after the layer of cubes has been received.

4. A sugar packing and boxing machine comprising a main frame, a receiving table pivotally mounted in said frame, a receiving platform pivotally mounted in the frame, means for assembling a plurality of cubes of sugar on the receiving table, and means for tilting the receiving table and the platform in unison to transfer the assembled sugar cubes from the table to the receiving platform, means adjacent the receiving platform for guiding the sugar received by the platform and means for transmitting a step by step receding movement to the receiving platform, each step by step movement being equal to the depth of one layer of cube sugar.

5. A sugar packing and boxing machine comprising a main frame, a receiving table pivotally mounted in said frame, a receiving platform pivotally mounted in the frame, means for assembling a plurality of cubes of sugar on the receiving table, and means for tilting the receiving table and the platform in unison to transfer the assembled sugar cubes from the table to the receiving platform, means adjacent the receiving platform for guiding the sugar received by the platform and means for transmitting a step by step receding movement to the receiving platform, each step by step movement being equal to the depth of one layer of cube sugar, and means for counterbalancing the weight of the sugar when placed upon the receiving platform.

6. A sugar packing and boxing machine comprising a main frame, a receiving table pivotally mounted in said frame, a receiving platform pivotally mounted in the frame, means for assembling a plurality of cubes of sugar on the receiving table, and means for tilting the receiving table and the platform in unison to transfer the assembled sugar cubes from the table to the receiving platform, means adjacent the receiving platform for guiding the sugar received by the platform and means for transmitting a step by step receding movement to the receiving platform, each step by step movement being equal to the depth of one layer of cube sugar, and means for counterbalancing the weight of the sugar when placed upon the receiving platform, and means for counterbalancing the weight of the platform.

7. A sugar packing and boxing machine comprising a main frame, a receiving table pivotally mounted in said frame, a receiving platform pivotally mounted in the frame, means for assembling a plurality of cubes of sugar on the receiving table, and means for tilting the receiving table and the platform in unison to transfer the assembled sugar cubes from the table to the receiving platform, means adjacent the receiving platform for guiding the sugar received by the platform and means for transmitting a step by step receding movement to the receiving platform, each step by step movement being equal to the depth of one layer of cube sugar, and means for counterbalancing the weight of the sugar when placed upon the receiving platform, and means for counterbalancing the weight of the platform and means for adjusting the receiving table and the receiving platform to permit the same to assume an inclined position.

8. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on receiving tables, so that they will be arranged in a series of separate squares, and means for transferring this cube sugar when so assembled to the receiving platforms.

9. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on receiving tables, so that they will be arranged in a series of separate squares, said tables, together with the arms between which they are pivotally mounted being adapted to be swung forwardly toward the receiving platforms, and tilted upwardly against the same by an operator, and means for transmitting the said movement to tilt the guide frame and the receiving platforms carried thereby toward the receiving table when this is tilted to permit the arranged sugar to be transferred from the receiving table to the receiving platforms.

10. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on receiving tables, so that they will be arranged in a series of separate squares, said tables, together with the arms between which they are pivotally mounted being adapted to be swung forwardly toward the receiving platform, and tilted upwardly against the same by an operator, and means for transmitting the said movement to tilt the guide frame and the receiving platforms carried thereby toward the receiving table when this is tilted to permit the arranged sugar to be transferred from the receiving table to the receiving platforms, and means controlled by the operator for transmitting a receding movement to the base and the receiving platforms carried thereby, which is equal to the depth of one layer of cube sugar after a layer of cube sugar has been deposited upon the receiving platforms.

11. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on receiving tables, so that they will be arranged in a series of separate squares, said tables, together with the arms between which they are pivotally mounted being adapted to be swung forwardly toward the receiving platforms, and tilted upwardly against the same by an operator, and means for transmitting the said movement to tilt the guide frame and the receiving platforms carried thereby toward the receiving table when this is tilted to permit the arranged sugar to be transferred from the receiving table to the receiving platforms, and means controlled by the operator for transmitting a receding movement to the base and the receiving platforms carried thereby, which is equal to the depth of one layer of cube sugar after a layer of cube sugar has been deposited upon the receiving platforms.

12. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on receiving tables, so that they will be arranged in a series of separate squares, said tables, together with the arms between which they are pivotally mounted being adapted to be swung forwardly toward the receiving platforms, and tilted upwardly against the same by an operator, and means for transmitting the said movement to tilt the guide frame and the receiving platforms carried thereby toward the receiving table when this is tilted to permit the arranged sugar to be transferred from the receiving table to the receiving platforms, and means controlled by the operator for transmitting a receding movement to the base and the receiving platforms carried thereby, which is equal to the depth of one layer of cube sugar after a layer of cube sugar has been deposited upon the receiving platforms, said means comprising a pivotally mounted rack bar by which the base member and the receiving platforms are supported, a keeper with which the teeth of the rack bar are engageable, and means for rocking the rack bar to bring alternate teeth into and out of engagement with the keeper to permit the base member and the receiving platforms carried thereby to recede step by step as the respective layers of cube sugar are deposited upon the receiving platforms.

13. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on the receiving table, so that they will be arranged in a series of separate squares, said tables, together with the arms between which they are pivotally mounted being adapted to be swung forwardly toward the receiving platforms, and tilted upwardly against the same by an operator, and means for transmitting the said movement to tilt the guide frame and the receiving platforms carried thereby toward the receiving table when this is tilted to permit the arranged sugar to be transferred from the receiving table to the receiving platforms, and means controlled by the operator for transmitting a receding movement to the base and the receiving platforms carried thereby, which is equal to the depth of one layer of cube sugar after a layer of cube sugar has been deposited upon the receiving platforms, said means comprising a pivotally mounted rack bar by which the base member and the receiving platforms are supported, a keeper with which the teeth of the rack bar are engageable, and means for rocking the rack bar to bring alternate teeth into and out of engagement with the keeper to permit the base member and the receiving platforms carried thereby to recede step by step as the respective layers of cube sugar are deposited upon the receiving platforms, and means adjacent each receiving platform for guiding the respective layers of cube sugar deposited thereon, and for preventing disarrangement of the respective layers of cubes.

14. A sugar packing and boxing machine comprising a main frame, a pair of arms pivotally mounted on said frame, a receiving table pivotally mounted in the upper ends of said arms, a rest for the table adapted to support it in a horizontal position, a pair of standards on the main frame, a guide frame pivotally mounted between said standards, a base member vertically slidable in said guide frame, a plurality of receiving platforms mounted on said base member, means for assembling cube sugar on receiving tables, so that they will be arranged in a series of separate squares, said tables, together with the arms between which they are pivotally mounted being adapted to be swung forwardly toward the receiving platforms, and tilted upwardly toward the receiving platforms, and tilted upwardly against the same by an operator, and means for transmitting the said movement to tilt the guide frame and the receiving platforms carried thereby toward the receiving table when this is tilted to permit the arranged sugar to be transferred from the receiving table to the receiving platforms, and means controlled by the operator for transmitting a receding movement to the base and the receiving platforms carried thereby, which is equal to the depth of one layer of cube sugar after a layer of cube sugar has been deposited upon the receiving platforms, said means comprising a pivotally mounted rack bar by which the base member and the receiving platforms are supported, a keeper with which the teeth of the rack bar are engageable, and means for rocking the rack bar to bring alternate teeth into and out of engagement with the keeper to permit the base member and the receiving platforms carried thereby to recede step by step as the respective layers of cube sugar are deposited upon the receiving platforms, and means adjacent each receiving platform for guiding the respective layers of cube sugar deposited thereon, and for preventing disarrangement of the respective layers of cubes, means for counterbalancing the weight of the base member and to receiving platforms, and means for counterbalancing the weight of the sugar as it is being deposited upon the receiving platforms.

15. A sugar packing and boxing machine comprising a main frame, a receiving table pivotally mounted in said frame, a receiving platform, a rocking support therefor, means for assembling a plurality of cubes of sugar on the receiving table, means for tilting the receiving table and the platform in unison to transfer the assembled sugar cubes from the table to the receiving platform, said means comprising a pivotal mounting for the platform in the rocking support and a link connection between the rocking support and the table, and means for adjusting the position of the rocking support and the pivotal mounting of the receiving table to incline the receiving table and platform on a line at right angles to their pivotal axis.

In testimony whereof we have hereunto set our hands in the presence of two subscribing witnesses.

JOHN D. SPRECKELS, Jr.
RICHARD LABORDA.

Witnesses:
H. E. Ross,
G. B. Waterman.

Copies of this patent may be obtained for five cents each, by addressing the "Commissioner of Patents, Washington, D. C."